United States Patent [19]

Wojtowicz

[11] 4,105,565
[45] Aug. 8, 1978

[54] PRODUCTION OF CALCIUM HYPOCHLORITE COMPOSITIONS FROM QUICKLIME AND DICHLORINE MONOXIDE

[75] Inventor: John A. Wojtowicz, Cheshire, Conn.

[73] Assignee: Olin Corporation, New Haven, Conn.

[21] Appl. No.: 820,669

[22] Filed: Aug. 1, 1977

[51] Int. Cl.$^2$ .......................... C09K 3/00; C01B 11/06
[52] U.S. Cl. .................................. 252/1; 252/187 R; 252/187 H; 424/149; 423/474
[58] Field of Search ............... 423/474; 252/1, 187 R, 252/187 H; 424/149

[56] References Cited

U.S. PATENT DOCUMENTS

| | | | |
|---|---|---|---|
| 2,157,558 | 5/1939 | Muskat et al. | 423/474 |
| 2,157,559 | 5/1939 | Muskat et al. | 423/474 X |

Primary Examiner—Brian Hearn
Attorney, Agent, or Firm—James B. Haglind; Donald F. Clements

[57] ABSTRACT

Calcium hypochlorite compositions useful as bleaching agents and disinfectants are produced by the reaction of solid granular quicklime with a gaseous mixture of dichlorine monoxide and an inert gas. The process takes place in the absence of a solvent and produces dry, free-flowing $Ca(OCl)_2$ compositions.

10 Claims, No Drawings

PRODUCTION OF CALCIUM HYPOCHLORITE COMPOSITIONS FROM QUICKLIME AND DICHLORINE MONOXIDE

This invention relates to a process for the production of calcium hypochlorite compositions useful as bleaching agents, disinfectants and decontamination agents.

Calcium hypochlorite is a commercially available product which is widely used as a commercial bleaching and sanitizing agent. It is produced by processes which react hydrated or slaked lime in solution with a chlorinating agent such as chlorine. The calcium hypochlorite product is obtained as a wet cake which requires careful drying to evaporate large amounts of water present while minimizing the loss of available chlorine by thermal decomposition.

There is need, however, for a process for producing calcium hypochlorite compositions having high available chlorine content which does not require a liquid solvent medium and which does not require a separate drying step.

It is an object of the present invention to provide a process for producing calcium hypochlorite compositions in the absence of a liquid solvent medium.

Another object of the present invention is to provide a process for producing calcium hypochlorite compositions in which evaporation of a solvent or separation from a solution is not required.

A further object of the present invention is a process for producing calcium hypochlorite compositions which are obtained as dry products.

These and other objects of the invention are provided in a process for producing calcium hypochlorite compositions which comprises reacting solid, granular quicklime with a gaseous mixture of dichlorine monoxide and an inert gas to form a reaction mixture, agitating said reaction mixture and recovering a calcium hypochlorite composition having an available chlorine content of at least 50 percent therefrom, said gaseous mixture containing from about 1 to about 30 percent by volume of said dichlorine monoxide.

In the novel process of the present invention, quicklime, a calcium oxide formed by calcining limestone so that carbon dioxide is liberated, is employed in the solid form. The quicklime should have an available lime content suitable for producing calcium hypochlorite compositions of the desired available chlorine content. Available lime represents the total calcium oxide (CaO) content in the quicklime, CaO being the active ingredient. The term "available lime" is synonymous with the term "active lime" and both provide a means for expressing the concentration of CaO in quicklime. Suitable quicklimes include those having an available lime content of at least 75 percent, and preferably at least 90 percent.

Quicklime is used in a particulate or granular form having a particle size in the range of from about 2 to about 300, and preferably from about 10 to about 150 microns.

Dichlorine monoxide is prepared by processes well known in the prior art, for example, by the reaction of the chlorine gas with mercuric oxide according to the equation:

$$2Cl_2 + 2HgO \rightarrow Cl_2O + HgCl_2 \cdot HgO. \quad (1)$$

Another suitable method of preparation for dichlorine monoxide is the chlorination of sodium carbonate or sodium bicarbonate illustrated by the following equations:

$$2Cl_2 + 2Na_2CO_3 + H_2O \rightarrow Cl_2O + 2NaHCO_3 + 2NaCl \quad (2)$$

$$2Cl_2 + 2NaHCO_3 \rightarrow Cl_2O + 2CO_2 + H_2O + 2NaCl \quad (3)$$

A detailed procedure for each of these methods of preparation for dichlorine monoxide is given in the publication Inorganic Synthesis, 5, 156-160, (N.Y. McGraw-Hill, 1957).

To eliminate potential explosion hazards, the dichlorine monoxide is employed in a gaseous mixture with a gas which is inert to the conditions of the reaction. Suitable inert gases include air, nitrogen, chlorine and nitrous oxide, with air and nitrogen being preferred. The gaseous mixture suitably comprises from about 1 percent to about 30 percent by volume of dichlorine monoxide. Preferably, the gaseous mixture comprises from about 5 percent to about 25 percent and more preferably from about 10 percent to about 23 percent of dichlorine monoxide.

In the novel process of the present invention, the gaseous mixture is reacted with solid quicklime to form calcium hypochlorite where the reaction is believed to take place according to the following equation:

$$CaO + Cl_2O \rightarrow Ca(OCl)_2.$$

Any suitable reaction temperatures may be used including, for example, those in the range of from about −10° to about 60° C., preferably at from about 10 to about 40° C.

The reaction proceeds using any suitable proportions of quicklime and dichlorine monoxide. For example, molar ratios of dichlorine monoxide gas to quicklime of from about 0.3:1 to about 2:1, and preferably from about 0.4:1 to about 1.2:1 can be employed.

During the reaction, it may be desirable to agitate the calcium oxide by mechanical means or to employ a rotating reactor having means such as flights to cascade the CaO. In a preferred embodiment, the process is conducted in a fluidized bed reactor where the gaseous mixture can be used advantageously to fluidize the calcium oxide. The principles in practice of employing fluidized bed reactors are well known as described, for example, in the Chemical Engineering Handbook, edited by R. H. Perry and C. H. Chilton, 5th edition, McGraw-Hill, 1973, section 20, pages 64-74.

In another embodiment, the reaction of the present process is run continuously with the gaseous mixture being recycled to the reactor.

Preferably, the rotary reaction vessel is equipped with lifting means such as flights which provide particle attrition during the reaction to prevent agglomeration or an increase in the particle size.

Another method of preventing agglomeration during the reaction removes a portion of the product from the reactor, passes the product through a screen and crushes or grinds oversized particles before returning them to the reactor.

Any suitable reaction times may be used. For commercial production, short reaction times are desirable and these can be obtained by conducting the reaction in a fluidized bed or controlling the particle size as discussed above.

The calcium hypochlorite compositions prepared by the novel process of the present invention have an available chlorine content of at least 50 percent, for example, in the range of from about 50 to about 90, and preferably from about 60 to about 75 percent. In addition to calcium hypochlorite, the compositions contain unreacted quicklime and some calcium chlorate. The calcium hypochlorite compositions have a calcium chloride content of less than about 1 percent. The compositions can be used directly without further drying. To provide compositions having available chloride compositions in the range of from about 50 to about 60 percent, it may be desirable to add an inert diluent such as sodium chloride to a composition which is produced having a higher available chlorine content, for example, 70 percent available chlorine.

These highly stable calcium hypochlorite compositions are suitable as bleaching and sanitizing agents. They are particularly suitable to be used in place of "tropical" or "supertropical bleaches" which have special utility as decontamination agents, for example, for mustard gas as well as being useful in sanitizing public water supplies. By maintaining a low calcium chloride content, the compositions produced by the process of the present invention will remain stable in the presence of high temperatures and high humidity.

The process of the present invention is further illustrated by the following example. All percentages are by weight unless otherwise specified.

EXAMPLE

Reagent grade calcium oxide (16.8 grams, 0.29 moles, having an available lime content of about 97 percent) was ground to form particle sizes in the range of from about 100 to about 325 mesh. The calcium oxide was placed in a reaction vessel. Dichlorine monoxide, generated by the reaction of HgO and $Cl_2$, was diluted with nitrogen gas to provide a gaseous mixture. The gaseous mixture was fed to the reaction vessel and a reaction mixture was formed in which the temperature was maintained in the range of from 30° to 40° C. by the heat of reaction. During the reaction period, the reaction mixture was stirred periodically and agglomerate particles formed were crushed. After about 20 hours, a dry, free-flowing product was removed from the reactor. The product had an available chlorine content of 70 percent, indicating a $Ca(OCl)_2$ content of 71 percent. The dry product also contained 11 percent unreacted lime, 16.8 percent calcium chlorate and less than 0.08 percent calcium chloride. The amount of dichlorine monoxide which reacted with the quicklime was calculated to be 0.29 moles.

What is claimed is:

1. A process for the production of a calcium hypochlorite composition which comprises reacting solid granular quicklime and a gaseous mixture of dichlorine monoxide and an inert gas to form a reaction mixture, agitating said reaction mixture and recovering a calcium hypochlorite composition having an available chlorine content of at least 50 percent therefrom, said gaseous mixture containing from 1 to about 30 percent by volume of said dichlorine monoxide.

2. The process of claim 1 in which said solid granular quicklime has a particle size of from about 2 to about 300 microns.

3. The process of claim 2 in which said reaction is conducted at a temperature in the range of from about −10° C. to about 60° C.

4. The process of claim 3 in which said solid granular quicklime is reacted with said gaseous mixture at molar ratios of $Cl_2O$ to $CaO$ of from about 0.3:1 to about 2:1.

5. The process of claim 4 in which said inert gas is selected from the group consisting of air, nitrogen, chlorine, and nitrous oxides.

6. The process of claim 5 in which said inert gas is nitrogen.

7. The process of claim 6 in which said gaseous mixture comprises from about 5 to about 25 percent by volume of dichlorine monoxide.

8. The process of claim 7 in which said reaction temperature is from about 10° C. to about 40° C.

9. The process of claim 8 in which said solid granular quicklime has a particle size of from about 10 to about 150 microns.

10. The process of claim 9 in which said molar ratios of $Cl_2O$ to $CaO$ are from about 0.4:1 to about 1.2:1.

* * * * *